United States Patent [19]

Sampson et al.

[11] Patent Number: 5,419,816
[45] Date of Patent: May 30, 1995

[54] ELECTROLYTIC PROCESS AND APPARATUS FOR THE CONTROLLED OXIDATION OF INORGANIC AND ORGANIC SPECIES IN AQUEOUS SOLUTIONS

[75] Inventors: Richard L. Sampson; Allison H. Sampson, both of San Antonio, Tex.

[73] Assignee: Halox Technologies Corporation, San Antonio, Tex.

[21] Appl. No.: 141,675

[22] Filed: Oct. 27, 1993

[51] Int. Cl.$^6$ .................. C25B 1/00; C02F 1/46
[52] U.S. Cl. .................. 204/59 R; 204/130; 204/149; 204/263; 210/748
[58] Field of Search .......... 204/59 R, 103, 78, 252, 204/263, 149, 130; 210/748

[56] References Cited

U.S. PATENT DOCUMENTS

| | | | |
|---|---|---|---|
| 2,794,777 | 8/1956 | Pearson | 204/151 |
| 3,074,863 | 1/1963 | Jasionowski | 204/151 |
| 3,764,499 | 10/1973 | Okubo et al. | 204/151 |
| 4,013,554 | 3/1977 | Reis et al. | 210/40 |
| 4,159,235 | 6/1979 | Kammel et al. | 204/272 |
| 4,299,675 | 11/1981 | Korach | 204/98 |
| 4,326,935 | 4/1982 | Moeglich | 204/180 P |
| 4,356,068 | 10/1982 | Darlington | 204/98 |
| 4,361,601 | 11/1982 | Hillman et al. | 427/123 |
| 4,369,103 | 1/1983 | White | 204/252 |
| 4,389,297 | 6/1983 | Korach | 204/252 |
| 4,402,809 | 9/1983 | Dilmore et al. | 204/254 |
| 4,472,252 | 9/1984 | DeLue | 204/59 R |
| 4,521,283 | 6/1985 | Pickens | 204/59 R |
| 4,596,641 | 6/1986 | Bridger et al. | 204/151 |
| 4,636,286 | 1/1987 | DeLue et al. | 204/59 R |
| 4,758,319 | 7/1988 | Klinkowski | 204/182.3 |
| 4,786,384 | 11/1988 | Gerhardt et al. | 204/149 |
| 5,026,465 | 6/1991 | Katz et al. | 204/182.4 |
| 5,183,565 | 2/1993 | Zimmermann et al. | 210/269 |
| 5,192,446 | 3/1993 | Salem et al. | 210/685 |

OTHER PUBLICATIONS

Helfferich, Ion Exchange; pp. 58–59, 1962, McGraw–Hill Book Company.
Newman, Electrochmical Systems, Second Edition, pp. 502–506.
Pletcher, Industrial Electrochemistry, Second Edition, 1990, pp. 160–167, 278–286 and 342–357.
Tison, Electrochemical Metals Recovery From Dilute Solutions Using Ion-Exchange Material, pp. 114–118.
White, The Handbook Of Chlorination, Second Edition, 1986, pp. 120–149.
Degremont, Water Treatment Handbook, Sixth Edition, 1991, vol. 1, Chapter 8.

*Primary Examiner*—Kathryn Gorgos
*Attorney, Agent, or Firm*—Jacobson, Price, Holman & Stern

[57] ABSTRACT

An electrolytic process and apparatus is disclosed for oxidizing or reducing inorganic and organic species, especially in dilute aqueous solutions. The electrolytic reactor includes an anode and cathode in contract with a packed bed of particulate ion exchange material which establishes an infinite number of transfer sites in the electrolyte to significantly increase the mobility of the ionic species to be oxidized or reduced toward the anode or cathode, respectively. The ion exchange material is cationic for oxidation and anionic for reduction, or a combination of both for special circumstances. Preferably, the ion exchange material is treated to convert a portion of the transfer sites to semiconductor junctions which act as mini anodes, or cathodes, to significantly increase the capacity of the reactor to oxidize or reduce the species to be treated. Exemplary applications for the disclosed electrolytic process and apparatus are the conversion of halides to halous acids in dilute solutions.

40 Claims, 6 Drawing Sheets

Latest Technology Unfilled Reactor

ELECTROLYTIC PROCESS AND APPARATUS FOR THE CONTROLLED OXIDATION OF INORGANIC AND ORGANIC SPECIES IN AQUEOUS SOLUTIONS

FIELD OF INVENTION

This invention relates to the oxidation or reduction of inorganic and organic species by directing the species through a packed bed ion exchange electrolytic reactor to produce the desired oxidized or reduced species.

Background of the Invention

It is generally known that oxidizing inorganic and organic species in dilute aqueous solutions by electrolysis is nearly impossible to accomplish because of the poor mobility of these species in such aqueous solutions to reach the anodic site where oxidation takes place.

An example of this technology, which is not limited in scope to this example, is the production of halous acids from dilute concentrations of their corresponding halide salts. Such halous acids are particularly useful as oxidizing agents. It is known that electrolyzing dilute halide salts to form their respective halous acid solutions is difficult to accomplish without forming other fully oxidized species such as the halates, which have little oxidizing effect. In order to solve this problem, a number of anodic systems utilizing noble metal catalysts have been developed to prevent the halate ion side reactions from taking place. Even with the latest dimensionally stable anodes, the side reactions will predominate unless the halide concentration in the aqueous solution being electrolyzed exceeds 1500 mg/l. At these elevated concentrations, a small percentage of the halide can be converted to the halous ion.

In actual practice, however, the halide salt concentration is kept between 5000 mg/l and 250,000 mg/l in order to convert a small percentage of the halide directly to the halous solution. At these high salt concentrations, the side reactions that form the undesired halate ions are significantly reduced or eliminated. However, the high concentration of residual salts causes additional problems. Concentrations of greater than 1500 mg/l of halide ions cause corrosion of various bimetal connections found in water plumbing systems, such as water distributors, cooling towers, and swimming pools, as well as any other aqueous process equipment. Thus, electrolysis has not proven to be a reasonable method for the production of halous acids, because the conversion rates are small, and the residual salts are harmful to the distribution systems.

Therefore, in order to control microbiological contamination in these aqueous systems, highly concentrated and potentially dangerous halous solutions are dosed into the dilute streams of water to maintain an adequate concentration of the halous acid needed to control or destroy the offending or undesirable microbes. These microbes can be as simple as pseudomonas and coliform in drinking water or can be viruses and gram positive organisms found in cooling towers, such as legionella. The concentration of these halous oxidizers is controlled in these systems by dosing in the chemical so that a permanent level of the oxidizer is maintained, sufficient to kill the target organism(s) by oxidation or to penetrate colonies or large organisms to disrupt the cell mechanism that causes growth. Contact time, concentration, and pH affect the activity or efficacy of the resultant solution.

Most halous solutions used in present systems are shipped to the point of use in the halite form to prevent autodecomposition of the halous acids back to their salts during transportation. Therefore, most of these solutions are shipped with an excess of caustic in order to render a very high pH for the solution, which ensures that they are active when the potential user requires their use. The user relies on the buffering capacity of the treated water to lower the pH of the halite solutions to a point where the halous acid forms and the solution becomes active. If the treated solution does not have the proper acidity, either too high or too low, required to produce the desired halous acid concentration by dosing, however, either acid or caustic must be added to maintain the activity level and effective half life of the halous acid.

All water as it is received in nature has various levels of salts, hardness ions, alkalinity, and pH which make it unfit for consumption or further commercial and industrial uses. Therefore, mechanical and chemical treatment, such as filtration and chlorination, must be performed on it to render it potable or fit for further use. Indeed, the Public Drinking Water Act and the World Health Organization require that potable water contain less than 500 mg/l of dissolved solids. As stated previously, it is impractical with the present technology to electrolyze water which contains less than 1500 mg/l of dissolved salt to form halous acids, such as hypochlorous acid. Therefore, potable water is impractical to electrolyze directly because of its low salt content. To make the water easy to electrolyze, salt must be added which then makes the water non-potable.

The dosing of municipal, industrial and commercial water systems is a major undertaking, requiring the shipment of enormous quantities of halogen solutions. It is estimated that in excess of 20 million tons of halogen solutions are shipped annually, in the United States and Canada alone.

When the contrary problem arises, where the solution to be treated contains too high a level of oxidizing substances or oxygen, chemical reducing agents are added in excess to reduce the oxidation problem to levels that present satisfactory operating conditions. These reducing agents can be as simple as carbon for strong oxidizers such as chlorine, or they can be strong reducing agents such as hydrazine which are dangerous to ship, handle, and dispense in accurate dosages.

The problem of the prior art electrolytic systems is that dilute salt solutions have low conductivity which results in low mobility of the reactive species to reach the appropriate site on the anode or cathode where the oxidation or reduction reaction can take place. The oxidation or reduction of the reactive species occurs when the free radical hydroxyl or free radical hydrogen, produced by the splitting of the water molecule at the cathode or anode, respectively, is contacted by the reactive species. As used herein, it is intended that the term "free radical hydroxyl" be synonymous with other terms used in the art for this electrolytic ion, such as previously used terms "nascent oxygen," "molecular oxygen" and "singlet oxygen." Similarly, the term "free radical hydrogen" is intended to be synonymous with other terms used in the art, such as "nascent hydrogen" and "singlet hydrogen."

The starvation of such reactive ions species as halide salts to the anode or cathode is a phenomena known in the art as polarization, and it results in the excess generation of free radical hydroxyl or free radical hydrogen which continues to oxidize or reduce the reactive ion species into a nonusable halate solution. An additional significant problem associated with electrolytic conversion of dilute halide solutions, as well as other dilute salt solutions, arises from the fact that the surface area of the anode or cathode is limited so that intimate contact between the species to be oxidized or reduced and the free radical hydroxyl or free radical hydrogen does not occur. Hence, very poor conversion of the species to be oxidized or reduced can be achieved. These two major problems existing with prior electrolytic methods have not been overcome to date.

Various mechanisms have been tried for mixing, and porous and packed bed electrodes have been tried, for the oxidation of halides to halous acids, without success to date. Indeed, the electrolytic industry has relied on noble metal oxides attached to substrates of titanium and its analogs to form desired semiconductor junctions at which water can be split and oxidation can take place. Porous electrodes help to solve the problem of large electrode surface area, but they do not resolve the problem of ionic mobility in dilute solutions.

There are many known electrochemical processes using resin and/or membranes in combination for many varied purposes, including the electro-demineralization of water both by empty and filled-cell electrodialysis, the electrodialytic concentration of soluble metals from dilute solutions onto the resins in the electrochemical apparatus, and the production of chlorine from concentrated brine in membrane chlor alkali cells. For example, in U.S. Pat. Nos. 4,299,675 and 4,356,068, ion selective membranes are used as an immobile electrolyte and the electrodes are bonded to the membrane to reduce ionic resistivity. Also of interest are U.S. Pat. Nos. 4,369,103 and 4,636,286. However, no prior art system has been effective in electrolytically oxidizing, or reducing, reactive species in dilute solutions having salt concentrations less than 1500 mg/l, especially in oxidizing dilute halide solutions to halous solutions.

Summary of the Invention

The present invention relates to a packed bed electrolytic reactor comprising an anode, a cathode and a packed bed of particulate ion exchange material provided between the anode and cathode. The particulate ion exchange material is closely packed between and in contact with the anode and cathode, and functions as an immobile electrolyte having an infinite number of transfer sites. The particulate ion exchange material and its transfer sites facilitate ionic mobility between the electrodes when using a dilute solution containing a reactive ionic species.

In another and preferred embodiment of the present invention, the ion exchange material is treated so that the electrolytic reactor will have numerous "semiconductor junctions" incorporated into the packed bed of particulate ion exchange material. The semiconductor junctions are formed by permanently attaching an oppositely charged ionic species (counter ion) to the particulate ion exchange material of the packed bed to occupy a percentage, preferably a minor percentage, of the exchange sites of the ion exchange material. Attachment of such a counter ion to an active site of the ion exchange material forms the semiconductor junction, which functions as an anode or a cathode, depending upon the ionic character of the counter ion, and acts as an electrocatalyst in the electrolytic reactions.

The invention further relates to processes for using the packed bed electrolytic reactor to oxidize or reduce desired inorganic or organic species, including the oxidation of halide ions to the halous state in dilute solutions, not previously possible. The process of the present invention also overcomes the problems of the prior art in an economical, practical and useful manner.

It is, therefore, a primary object of the present invention to provide an improved electrolytic reactor in which mobility of the reactive ion species to be oxidized or reduced toward the anode or cathode, respectively, is significantly increased, especially in dilute aqueous solutions.

Another primary object of the present invention is to provide a method and apparatus for improving the efficiency of electrolytic oxidation or reduction of an inorganic or organic species, especially in dilute aqueous solutions.

A further object of the invention is to provide an electrolytic reactor having semiconductor junction sites which act as extended anodic or cathodic sites at which oxidation or reduction can occur, at locations spaced from the anode and cathode.

It is a still further object of the invention to provide improved electrolytic processes for oxidizing and reducing inorganic and organic species in dilute solutions.

Yet another, and very important, object of the present invention is to provide an electrolytic reactor which can be employed at a user's site to generate halous acid from halide salts to control microbiological contamination in dilute aqueous water solutions. As a result, for the first time, direct electrolytic conversion of the halide salts to halous acids is feasible for dilute aqueous solutions, such as used for municipal drinking water, commercial and industrial usages including water distributors and cooling towers, and swimming pools.

These together with other objects and advantages which will become subsequently apparent reside in the details of the technology as more fully hereinafter described and claimed, reference being had to the accompanying drawings forming a part hereof, wherein like numerals refer to like parts throughout.

DETAILED DESCRIPTION OF THE INVENTION

Figure 1:
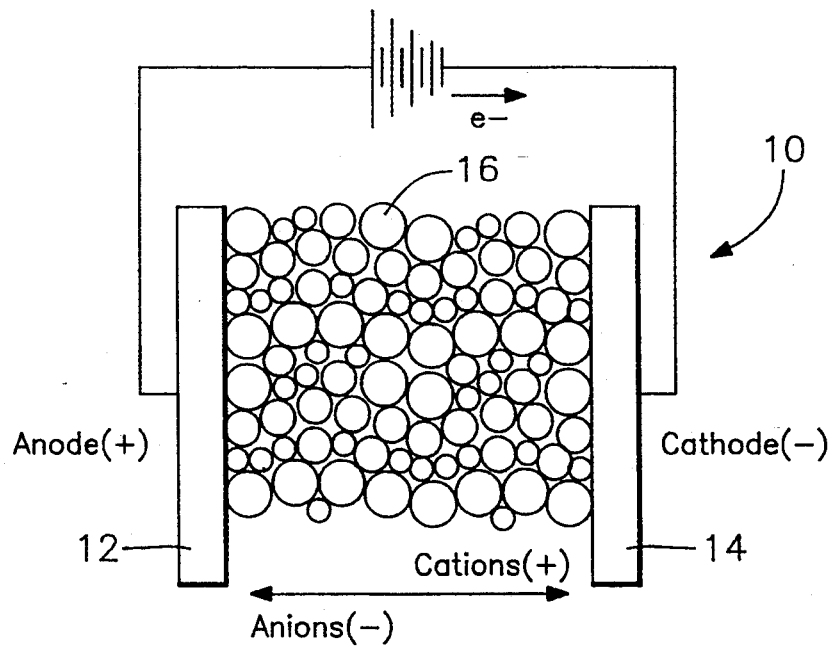
FIG. 1 shows a cross-sectional view of a basic packed bed electrolytic reactor in accordance with the present invention.

Referring now to FIG. 1, there is shown a cross-sectional view of a basic packed bed electrolytic reactor 10 of the present invention. The electrolytic reactor 10 includes an anode 12, a cathode 14 and a packed bed of particulate ion exchange material 16 located therebetween. The anode and cathode are connected to a source of direct current (DC) in a conventional manner. As shown, the anions move toward the anode and the cations move toward the cathode of the ionic circuit through the packed ion exchange material. Meanwhile, electrons travel the external circuit from the anode to the cathode in the conventional manner.

Figure 2:
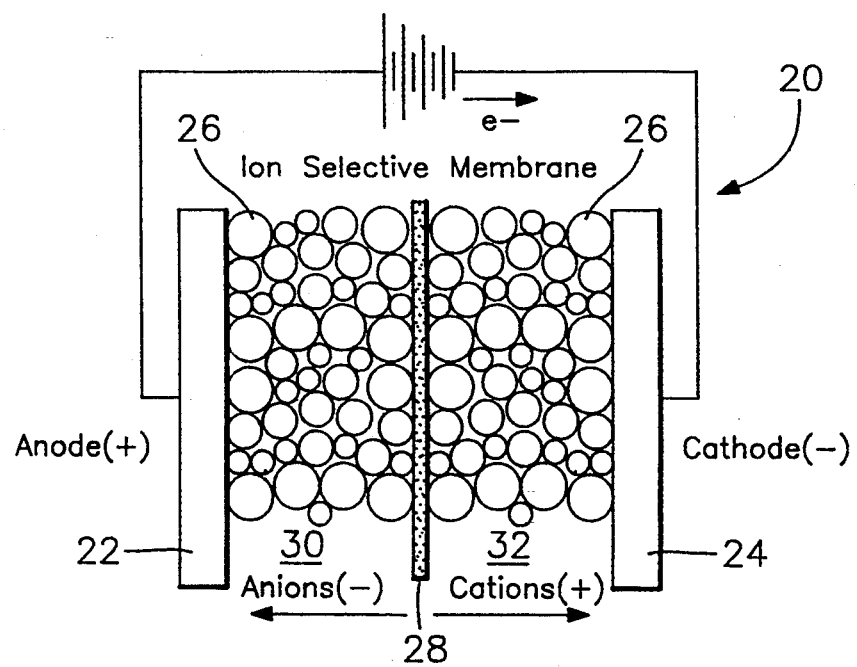
FIG. 2 shows a cross-sectional view of another embodiment of an electrolytic reactor in accordance with the present invention.
Figure 1A:
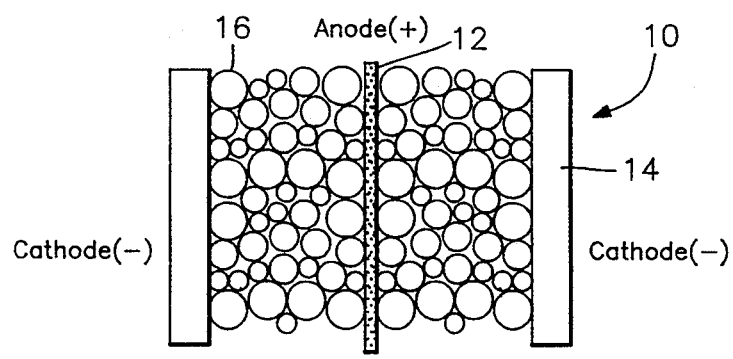
FIG. 1A shows a cross-sectional view of another basic packed bed electrolytic reactor in accordance with the present invention.

In the embodiment shown in FIG. 1A where like numerals are used, the cathode 14 is in the form of a cylindrical tube, and the anode 12 extends substantially along the central axis of the cathode 14. The particulate ion exchange material 16 is packed into the annular space between the anode 12 and cathode 14. Another embodiment of a packed bed electrolytic reactor of this invention is shown in FIG. 2. In this embodiment, the electrolytic reactor 20 includes anode 22 and cathode 24 which may be in the shape of rods, plates or the like. The particulate ion exchange material 26 is divided into two chambers, anodic chamber 30 and cathodic chamber 32, separated by an ion exchange membrane 28.

While the arrangements of anode, cathode and packed bed illustrated in FIGS. 1, 1A and 2 are presently considered preferable, any arrangement in which a particulate ion exchange material is packed between the anode and cathode in an electrolytic reactor can be used in accordance with this invention. Other embodiments of the invention include, but are not limited to: separation of anolyte and catholyte compartments to control intermixing of gases and solutions; and provision of any number of packed-bed chambers separated by ion exchange membranes or diaphragms placed between the anode and cathode to affect other oxidation, reduction, or displacement reactions.

As used herein, the term "particulate ion exchange material" includes granules, beads or grains of ion exchange material. The particulate ion exchange material can be an oxidizing exchanger, i.e., a cation exchange resin, or a reducing exchanger, i.e., an anion exchange resin. Examples of ion exchange materials suitable for the present invention include: strong acid polystyrene divinylbenzene cross-linked cation exchangers; weak acid polystyrene divinylbenzene cross-linked cation exchange resins; iminodiacetic acid polystyrene divinylbenzene cross-linked chelating selective cation exchangers; strong base polystyrene divinylbenzene cross-linked Type I anion exchangers; weak base polystyrene divinylbenzene cross-linked anion exchangers; strong base/weak base polystyrene divinylbenzene cross-linked Type II anion exchangers; strong base/weak base acrylic anion exchangers; strong acid perfluoro sulfonated cation exchangers; strong base perfluoro aminated anion exchangers; naturally occurring anion exchangers such as certain clays; naturally occurring cation exchangers such as manganese greensand. The foregoing list of ion exchange materials is considered to be illustrative only of suitable types of ion exchange materials useful in the present invention, but is not intended to be limiting of the present invention. Furthermore, mixtures of anion and cation exchange particles may also be used under certain circumstances in order to achieve a particular result.

Typical ion exchange resins which are commercially available and useful in the present invention are: IR 120 sold by Rohm and Haas Company, C 267 sold by Sybron Chemical Inc., and CG 68 sold by Resin Tech, Inc., typical of the synthetic strong acid cation exchange resins that have sulfonated exchange sites; IR 84 sold by Rohm and Haas, typical of synthetic weak acid exchange resins that have carboxylic acid sites; IRC 718 and C 467 sold by Rohm and Haas, typical of synthetic cation resins that are used for entrapping metal ions on a selective basis; manganese greensand, typical of naturally occurring cation exchangers; IRA 410 sold by Rohm and Haas, ASB 2 sold by Sybron Chemical, and SGG 2 sold by Resin Tech, typical of synthetic mixed base anion exchange resins that have quaternary ammonium groups as exchange sites; and IRA 94 sold by Rohm and Haas, typical of synthetic weak base exchange resins featuring tertiaryamine exchange sites.

The anode and the cathode may be made of any suitable material, based on the intended use of the electrolytic reactor. For example, for halous acid production from a halide solution, the anode may be made of a conventional material, such as ruthenium and/or iridium on titanium metal or a titanium oxide ceramic, and the cathode may be stainless steel or steel. Suitable anode and cathode materials are known to those skilled in the art and selection of a particular anode or cathode material is considered within the skill of those knowledgeable in this field.

In the preferred form of the invention, the particulate ion exchange material, such as ion exchange beads, is packed between the electrodes so that the beads are in full contact with the electrodes and with each other. The ionic sites of the ion exchange material then serve as transfer sites for the mobile ions in solution, thus greatly increasing their mobility under the influence of the DC electric field between the anode and cathode. While not intending to be bound by this theoretical explanation, it is believed that the ionic sites of an ion exchange material act as transfer sites because the bead to bead contact is similar to an ion exchange membrane in that there is a continuous ionic connection of ion exchange material of the same nature, either cationic or anionic, which forms an ionic circuit between the electrodes. It is believed that the mobile ions to be transferred travel on the oppositely charged ion exchange materials displacing the like charged ion that is residing there. Indeed, this packed ion exchange material acts as an immobile electrolyte artificially raising the conductivity of the solution between the electrodes and facilitating the transfer of ions to their respective oppositely charged electrodes. The difference between an ion exchange membrane and a packed bed of ion exchange material is that the solution to be treated is allowed to flow freely between the ion exchange material in the packed bed whereas the solution is restricted from passing freely through an ion exchange membrane.

In an alternate, but preferred form of this invention, the bed of ion exchange material is specially treated. Specifically, what has now been discovered is that when an ionic site within an ion exchange bead, or other ion exchange material, is permanently exchanged with a counter ion that is not transferable, a semiconductor junction is formed which will split water molecules. Hence, when so treated, it was surprisingly found that these semiconductor junction sites act as extended anodic or cathodic sites at which oxidation or reduction can occur in the reactor, at locations spaced from the anode and cathode.

The exchange of non-transferable ions can happen when selected slightly soluble multivalent ions are passed through an ion exchanger of the opposite charge displacing the soluble ions that are occupying those sites. They can be transferred or displaced only if they are reduced or oxidized to a more soluble species than the surrounding solution. For example, a cation exchange resin, such as IR 120 sold by Rohm and Haas, which has a very large number of immobile anionic sites, can have a multivalent ion such as $Fe^{+3}$ or $Pt^{+4}$ attached to a portion of the anionic sites. The multivalent ions are not transferable and, therefore, form a permanent semiconductor junction. The following is one example of such a semiconductor junction:

$$R-[SO_3]^{-4} Pt^{+4}$$

R is reprsentative of the organic part of a cation exchange resin, and the sulfonate group represents the anionic sites thereof. Since the sulfonate group has a single negative charge, platinum in the $+4$ state ties up four $SO_3^-$ sites, and it becomes ionically bonded to the four sulfonate groups as a metal oxide. As so bonded, the $Pt^{+4}$ ion is not removable from those sites except by incineration.

It has been found that this cation $Pt^{+4}$ semiconductor junction acts similarly to bipolar ion exchange membranes where a cation selective membrane is bonded to an anion selective membrane in that the semiconductor junction can split the water molecules of the aqueous solution. However, the semiconductor junction does not form the hydroxyl ion ($OH^-$), as does the bipolar junction, but rather forms free radical hydroxyl ($OH^0$) similar to an anode. Thus, each one of these semiconductor junctions acts as a mini anode to oxidize the available halide, sulfate or other anion in a solution in contact therewith. Meanwhile, the sites that are not bound up by the multivalent ion act as transfer sites for the mobile ions in the solution in the manner previously described. Further, since these semiconductor junctions are anodic, they carry a positive charge which attracts the anion to the site to be oxidized. The contrary happens on a anion resin that has a permanent anion attached, except that now the reaction is a reduction reaction. In this condition, the anion semiconductor junction can even reduce oxygen to water.

A cation exchanger that has counter ions permanently attached to its active ionic sites provides semiconductor junctions which are available for the production of free radical hydroxyl, thus making the solution an oxidizing solution. Similarly, an anion exchanger which has counter ions permanently attached to its active ionic sites now has semiconductor junctions for the production of free radical hydrogen, thus making the solution a reducing solution. In the example given above of $Pt^{+4}$ ionically bonded to sulfonate anionic sites, the semiconductor junction occurs within the metal sulfone group and can give rise to either water splitting or the generation of free radical hydroxyl and hydrogen ion. If the free radical does not locate a species to be oxidized, it decomposes back to hydroxyl ion, because it does not have an external circuit to contribute the electron to. The generation of this free radical hydroxyl and its decomposition is extremely rapid and is believed to have a half life of less than 1/10,000 of a second.

As such, these semiconductor junctions serve as additional sites for the production of free radical hydroxyl or free radical hydrogen, in addition to the anode and cathode themselves. These junctions significantly increase the number of sites at which the electrolytic reactions take place. At the same time, these junctions attract the species to be oxidized or reduced because they are oppositely charged. Thus, the semiconductor junctions not only increase the sites for producing the free radicals, but also act to decrease the time it takes for the species to reach a reaction site.

Another aspect of the water splitting reaction at the semiconductor junctions is that it forms the hydrogen ion ($H^+$) and the hydroxyl ion ($OH^-$) if there is nothing to be oxidized or capable of being oxidized at the junction. The hydrogen ion is in excess to the equilibria and has the ability to ionically displace mobile cations that are located on the transfer sites unoccupied by the semiconductor junctions. As the water splitting reactions proceed, more and more mobile cations are displaced, and a majority of the transfer sites are converted to the hydrogen form. The opposite reaction takes place on the anion resin in that the semiconductor junctions are of a reducing nature, and the excess hydroxyl ions are capable of displacing mobile anions that are located on the adjacent transfer sites. The result of the displacement reactions is the "regenerating" of the ion exchange material by internally generated chemical. The reactions from the splitting of water are as follows:

Anodic Reactions $$2H_2O - 4e^- \rightleftharpoons O_2 + 4H^+$$

Cathodic Reactions $$2H_2O + 2e^- \rightleftharpoons H_2 + 2OH^-$$

Hence, the ion exchange materials could be placed between electrodes or ion selective membranes in a direct current field and regenerate those materials in place by internally generated hydrogen and hydroxyl ions. These materials can be arranged in a mixture of cation and anion exchange materials or in discrete layers of cation material and anion material. The arrangement of such materials is analogous to mixed bed ion exchange systems and separate bed ion exchange systems.

It has also been found that pH can be controlled by varying the number of semiconductor junctions loaded on the ion exchange material and the amperage applied to that same packed bed ion exchange material. The unpacked reactor has no effect on pH, because it contains no ion exchange material and, therefore, cannot utilize the excess hydrogen ion generated at the semiconductor junctions. In other words, an unpacked reactor has no effect on pH versus current as equivalent amounts of hydroxyl and hydrogen ions are made. This phenomena is directly analogous to the aforementioned displacement/regeneration reactions.

In contrast, according to the present invention, if the ion exchanger is heavily loaded with metal ions and many semiconductor junctions are formed, the number of transfer sites will be limited both for displacement and transfer of ions to be oxidized. This will result in a solution with a lower pH and higher redox potential. The ratio of transfer sites to semiconductor junctions can be optimized and used to control the solution to be produced. For example, a stable iodite solution can be formed with a higher concentration of hypoiodous acid at a higher pH. As a consequence, the redox potential of the resulting solution can be controlled by directing the solution through a packed bed of cationic material bounded by an anode and a cathode to which a specific direct current [DC] is applied.

A typically suitable method for forming the semiconductor junctions for an oxide is the following. A suitable cation resin and a soluble form of a polyvalent metal salt solution, where the metal is existing in the cationic form, are selected. Some polyvalent metals exist in solution in their reduced state, such as ferrous iron and stannous tin, and some exist in solution as anionic complexes, such as platinum. The stoichiometric capacity of the selected resin is calculated, in equivalents, and then the metal salt solution is circulated through the ion exchange resin until it is taken up and exchanged completely with either hydrogen ion or sodium, whichever results in a soluble solution. Depending upon the concentration of the polyvalent metal salt in the solution, the amount of substitution of polyvalent metal ions permanently attached to the cation resin can range from as low as 1% to substantially complete loading, i.e., greater than 95%. To load any further it is possible but would be very difficult. Then, because the cation exchange resin is to be used in an oxidation reaction, the polyvalent metal ion, if in its reduced state, is converted to its highest valency or oxidation state. A simple procedure for conversion to the highest valency is by bubbling air or oxygen through the resin bed permanently affixing the counter ion to the resin. When the counter ion loading is calculated, it is important to use the highest valency possible, because as oxidization occurs and an electron is removed, capacity or transport sites are used up.

It has been found from experimentation using strong acid cation exchangers, such as IR 120 sold by Rohm and Haas and CG 68 sold by Resin Tech, with varying levels of permanent semiconductor junctions formed with iron in the ferric state ($Fe^{+3}$) and platinum in the platinic state ($Pt^{+4}$), the conversion of halides improved from small amounts (about 2%) of $Fe^{+3}$ counter ion loading, with performance increasing up to about 50% loading. Any increase in the counter ion $Fe^{+3}$ loading above about 50% did not appear to increase conversion. However, the ratio of semiconductor junctions to transport sites did affect the resultant pH of the solution. This resultant pH does, in turn, affect the reactivity of the halous acid. In contrast to the $Fe^{+3}$ counter ions, trace loading of platinum counter ions $Pt^{+4}$ on strong acid cation resins produced substantially improved performance in the conversion of the halides. Hence, it is currently believed that the multivalent noble metals may be better for performing specific selective oxidations. The presently preferred metals could be one or more following, either separately or in some mixture: platinum, ruthenium, iridium, lead, tin, and iron.

Therefore, if the proper semiconductor junction materials, ratio of sites, contact time, and mixing are correctly selected, it is believed that there is no limit to the percent conversion of the species to be oxidized or reduced, and 100% conversion can be approached. Further, a combination of cation exchange material and anion exchange material may be used to achieve specific results. In addition, a mixture of counter ions bonded to one type of ion exchange material may be used to improve the efficiency of certain reactions. For example, a cation exchange resin could have some semiconductor junctions formed by ruthenium ions and others formed by iridium ions.

In order to optimize and/or specialize the oxidation or reduction reactions, the aqueous solution containing the species to be oxidized or reduced preferrably may be pretreated by various means. Some examples of pretreatment which may be used, but are not always necessary in accordance with this invention, include the following: filtration for clarity; carbon filtration for the removal of undesirable organics; specialized ion exchange of the common salts found in water to the desired salts to form specific oxidized or reduced species; and addition of desired species to deionized or other high purity waters to form specific oxidized or reduced species. Other pretreatments may occur to those skilled in the art depending upon the species to be oxidized or reduced, the make up of the aqueous solution, the nature of the ion exchange material and semiconductor junction, and other variables.

Description of Specific Embodiments and Examples

In describing specific embodiments of the invention, specific terminology will be resorted to for the sake of clarity. However, the invention is not intended to be limited to the specific terms so selected, or to the specific embodiment disclosed. It is to be understood that each specific term includes all technical equivalents which operate in a similar manner to accomplish a similar purpose and the specific embodiments are intended to illustrate, but not limit, the broad technical application and utility of the present invention.

Loading of a Particulate Ion Exchange Material to Form Semiconductor Junctions

In order to load an ion exchange resin with a counter ion in a uniform manner, it is necessary to add the counter ions to a bed of ion exchange material which is being agitated so that each particle is exposed to the counter ions in a uniform manner. In addition, the capacity or number of ion exchange sites of any ion exchange material varies widely from batch to batch. For example, IR 120, a cation exchange resin from Rohm and Haas, has a capacity of 1.8 to 2.0 meq/ml (milliequivalents per milliliter). Similarly, IRA 410, an anion exchange resin from Rohm and Haas, has a capacity of 1.2 to 1.4 meq/ml. Therefore, a post-analysis is required to determine the ratio of transfer sites versus permanently loaded semiconductor junctions.

Example 1—Forming Semiconductor Junctions on a Cation Exchange Material Using Iron A one liter batch of strong acid cation resin with about 15% of its exchange sites permanently converted to semiconductor junctions and about 85% of its exchange sites remaining as transfer sites is prepared as follows.

One liter of Rohm and Haas IR 120 Plus cation resin in the hydrogen form, which is an 8% cross-linked divinylbenzene sulfonated polystyrene strong acid cation exchanger, and three liters of deionized water are placed in a large stirred reactor. While stirring the cation resin/water mixture, a ferrous sulfate solution of 14.4 grams $FeSO_4$ dissolved in one liter of deionized water is added to the cation resin/water mixture at a rate of 33.3 ml/min until all of the ferrous sulfate solution is exchanged onto the cation resin. Stirring is continued for at least one hour to ensure that all of the iron has been taken up by the cation resin. The iron taken up by the cation resin is in the $Fe^{+2}$ (ferrous) form.

Next, the ferrous ion on the cation resin is converted to the $Fe^{+3}$ (ferric) form by aerating the cation resin by bubbling oxygen or air through the cation resin/water mixture for at least twelve hours. The remaining iron solution is rinsed out of the loaded resin by passing five liters of deionized water through the resin. A sample of the resultant solution is taken and tested for iron. If any iron remains in the solution, the quantity of iron remaining must be subtracted from the iron originally in the ferrous solution to determine the number of total equivalents of iron exchanged.

A known volume of the converted cation resin is then titrated to a neutral pH with sodium hydroxide to measure the number of equivalents of sodium ion exchanged with hydrogen ion to determine the number of transfer sites or equivalents still remaining in the cation resin. The number of remaining transfer equivalents plus the total equivalents of iron exchanged equals the total capacity of the cation resin. The percentage of semiconductor sites to total ion exchange sites in the cation resin is calculated as follows:

$$\frac{\text{meq } Fe^{+3}}{\text{meq } Fe^{+3} + \text{meq } Na^+} \times 100 = \% \text{ semiconductor junctions.}$$

A cation resin having a lower or higher proportion of semiconductor junctions up to about 95% according to the above procedure, can be achieved by varying the concentration of $FeSO_4$ in the ferrous sulfate solution porportionately. For example, to produce a cation resin having about 1% semiconductor junctions formed by permanently attached $Fe^{+3}$ ions, the ferrous sulfate solution should contain 0.96 grams $FeSO_4$ in one liter of deionized water; to produce a cation resin having about 10% semiconductor junctions, the ferrous sulfate solution should contain 9.6 grams $FeSO_4$ in one liter of deionized water; and to produce a cation resin having about 50% semiconductor junctions, the ferrous sulfate solution should contain 48.0 grams $FeSO_4$ in one liter of deionized water.

Example 2—Forming Semiconductor Junctions on a Cation Exchange Material Using Platinum A one liter batch of strong acid cation resin with less than 1% of its exchange sites permanently converted to semiconductor junctions and the rest of its exchange sites remaining as transfer sites is prepared as follows.

One liter of the Rohm and Haas IR 120 Plus cation resin in the hydrogen form and three liters of deionized water are placed in a large stirred reactor. While stirring the cation resin/water mixture, a platinnic chloride solution of 15.7 grams of a 10% $PtCl_4$ solution in 10% hydrochloric acid (HCl) dissolved in one liter of deionized water is added to the cation resin/water mixture at a rate of 33.3 ml/min until all of the platinnic chloride solution is exchanged onto the cation resin. Stirring is continued for at least one hour to ensure that all of the platinum has been taken up by the cation resin. The platinum taken up by the cation resin is in the $Pt^{+4}$ form. Excess HCl solution is rinsed out of the loaded resin by passing 5 liters of deionized water through the resin. A sample of the resultant solution is taken and tested for platinum. If any platinum remains in the solution, the quantity of platinum remaining must be subtracted from the platinum originally in the platinic chloride solution to determine the number of total equivalents of platinum exchanged.

A known volume of the converted cation resin is then titrated to a neutral pH with sodium hydroxide to measure the number of equivalents of sodium ion exchanged with hydrogen ion to determine the number of transfer sites or equivalents remaining in the cation resin. The number of remaining transfer equivalents plus the total equivalents of platinum exchanged equals the total capacity of the cation resin. The percentage of semiconductor sites to total ion exchange sites in the cation resin is calculated as follows:

$$\frac{\text{meq } Pt^{+4}}{\text{meq } Pt^{+4} + \text{meq } Na^+} \times 100 = \% \text{ semiconductor junctions.}$$

To produce a cation resin having a lower or higher proportion of semiconductor junctions up to about 95% according to the above procedure, the concentration of $PtCl_4$ in the platinnic chloride solution is varied proportionately.

Example 3—Forming Semiconductor Junctions on an Anion Exchange Material Using Sulfonated Polystyrene A one liter batch of strong basic anion resin with about 15% of its exchange sites permanently converted to semiconductor junctions and about 85% of its exchange sites remaining as transfer sites is prepared as follows.

One liter of Rohm and Haas IRA 410 anion resin in the hydroxyl form, which is an 8% cross-linked divinylbenzene aminated polystyrene Type II strong base/weak base anion exchanger, and three liters of deionized water are placed in a large stirred reactor. While stirring the anion resin/water mixture, a solution of 17.5 grams of SPS 70 sold by National Starch and Chemical Company, which is a 70,000 Dalton (Molecular Weight) sulfonated polystyrene (SPS) dissolved in one liter of deionized water is added to the anion resin/water mixture at a rate of 20 ml/min. until all of the SPS solution is exchanged onto the anion resin. Stirring is continued for at least one hour to ensure that all of the SPS 70 has been taken up by the anion resin.

Next, a sample of the solution is taken and tested for any SPS 70. If any SPS 70 remains in the solution, the quantity remaining must be subtracted from the SPS 70 originally in the SPS 70 solution to determine the number of total equivalents of SPS 70 exchanged. The anion resin is rinsed with deionized water for at least one hour.

A known volume of anion resin thus produced is then titrated to a neutral pH with hydrochloric acid to determine the number of equivalents of chloride ion exchanged with hydroxyl ion to determine the number of transfer sites or equivalents remaining in the anion resin. The number of remaining transfer equivalents plus the total equivalents of SPS 70 exchanged equals the total capacity of the anion resin. The percentage of semiconductor sites to total ion exchange sites in the anion resin is calculated as follows:

$$\frac{\text{meq SPS 70}}{\text{meq SPS 70 + meq Cl}} \times 100 = \% \text{ semiconductor junctions.}$$

To produce an anion resin having a lower or higher proportion of semiconductor junctions up to about 95% according to the above procedure, the concentration of SPS 70 in the SPS 70 solution is varied proportionately. For example, to produce an anion resin having about 1% semiconductor junctions formed by permanently attached SPS ions, the SPS 70 solution should contain 1.17 grams SPS 70 in one liter of deionized water; to produce an anion resin having about 10% semiconductor junctions, the SPS 70 solution should contain 11.7 grams SPS 70 in one liter of deionized water; and to produce an anion resin having about 50% semiconductor junctions, the SPS 70 solution should contain 58.3 grams SPS 70 in one liter of deionized water.

The above procedures can be used to produce cation and anion resins having a percentage of semiconductor junctions up to about 95%, based on the total number of ion exchange sites of the resin. Those skilled in the relevant art can adapt the above procedures for different ion exchange materials and different counter ions having different gram molecular weights and valencies and can readily perform the necessary calculations to determine the appropriate concentration of counter ion solution necessary to produce a desired percentage of semiconductor junctions on a particular cation or anion resin.

Example 4—The Packed Bed Electrolytic Reactor

Figure 10:
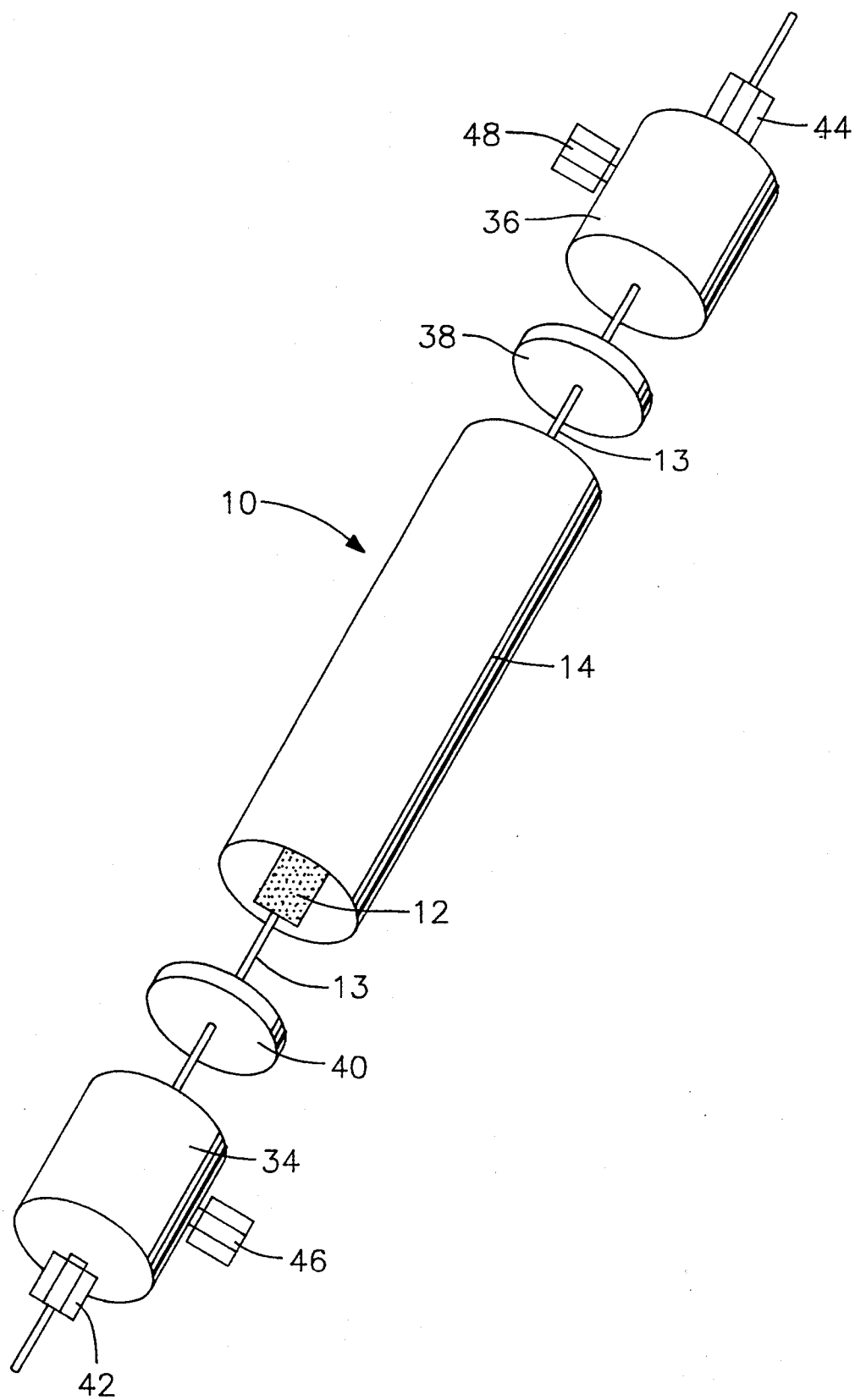
FIG. 10 shows an exploded perspective view of an electrolytic reactor constructed in accordance with FIG. 1A and used in connection with the tests producing the results illustrated in FIGS. 3–9.

One example of a packed bed electrolytic reactor having the configuration shown in FIGS. 1A and 10 was constructed as follows.

Anode 12 was centered inside a tubular cathode 14 to permit liquid flow from bottom to top in the annular space defined between the anode and the cathode. The anode 12 was a titanium dimensionally stable anode coated with iridium oxide comprising two pieces, each of which was 12 inches long×0.5 inches wide, the structure being an expanded metal mesh with center conducting wire 13 in between. The surface area of the anode was approximately 22.5 in$^2$ (145 cm$^2$). The cathode 14 was a tubular 316 stainless steel pipe with plastic end caps 34 and 36. The cathode had a 1 inch inner diameter and was 12 inches long. The surface area of the cathode was 37.7 in$^2$ (243.2 cm$^2$).

Particulate ion exchange resin was poured into the annular space between the anode and the cathode along with water to completely fill the void space so that the packed particulate ion exchange material contacted itself as well as the anode and cathode. Porous polypropylene plugs 38 and 40 were provided at the top and bottom of the cathode to retain the packed particulate ion exchange material within the annular space between the cathode and anode. Appropriate fittings 42 and 44 are drilled and tapped into the caps 34 and 36 to allow for extension and centering of the electrode wire 13, and inlet and outlet fittings 46 and 48 are provided to allow for fluid ingress and egress.

Electrolytic Production of Hypohalous Acids From Aqueous Halide Solutions

The following examples demonstrate the electrolytic process of the invention for the controlled oxidation of halide species in aqueous solutions. In each example, the tests were all done with the eletrolytic reactor described in Example 4 above, and illustrated in FIGS. 1A and 10, and under the same set of conditions. All water was tempered to 77° F., and all solutions flowed upwardly through the reactor. The inlet concentration of potassium iodide (KI) and sodium bromide (NaBr) was 100 mg/l. The graphs shown in FIGS. 3-9 illustrate the results of different packings at the specified flowrates and electrical currents.

Example 5—Oxidation of Iodide Ions

A potassium iodide feed solution was prepared as follows. First, a separate bed of cation resin was regenerated to the potassium form and another bed of anion resin was regenerated to the iodide form by passing a 10% solution of potassium iodide in softened water through them in a co-current manner as in a normal water softener device. The resin beds were then rinsed of excess KI solution. Tap water, pretreated by 5 micron pre-filtration followed by carbon treatment to remove organic, chlorine and chloramine compounds that are normally found in public tap waters, was then passed in series through first the cation resin bed and then the anion resin bed, to yield a feed solution of approximately 100 mg/l of KI.

(A) A continuous stream of the 100 mg/l KI feed solution was passed through the packed bed electrolytic reactor having the structure described in Example 4 by passing the KI solution through the reactor from the bottom to top such that the KI solution had a flow rate of 1 liter per minute through the electrolytic reactor. The annular space between the anode and the cathode in this example was packed with IR-120 plus cation resin in the potassium form. While passing the KI solution through the packed bed electrolytic reactor, a controlled current was applied to the cathode and anode.

(B) The procedure of (A) above was repeated, with the exception that the annular space between the anode and cathode was packed with IR-120 Plus cation resin in which 15% of the ion exchange sites had been converted to $Fe^{+3}$ semiconductor junctions as described in Example 1.

(C) The procedure of (A) above was repeated, with the exception that the annular space between the anode and cathode was packed with IR-120 Plus cation resin in which 95% of the ion exchange sites had been converted to $Fe^{+3}$ semiconductor junctions as described in Example 1.

(D) The procedure of (A) above was again repeated, with the exception that the annular space between the anode and cathode was not packed with any particulate ion exchange material. This example serves as a comparative example of a conventional system employing only an anode and a cathode.

Figure 3:
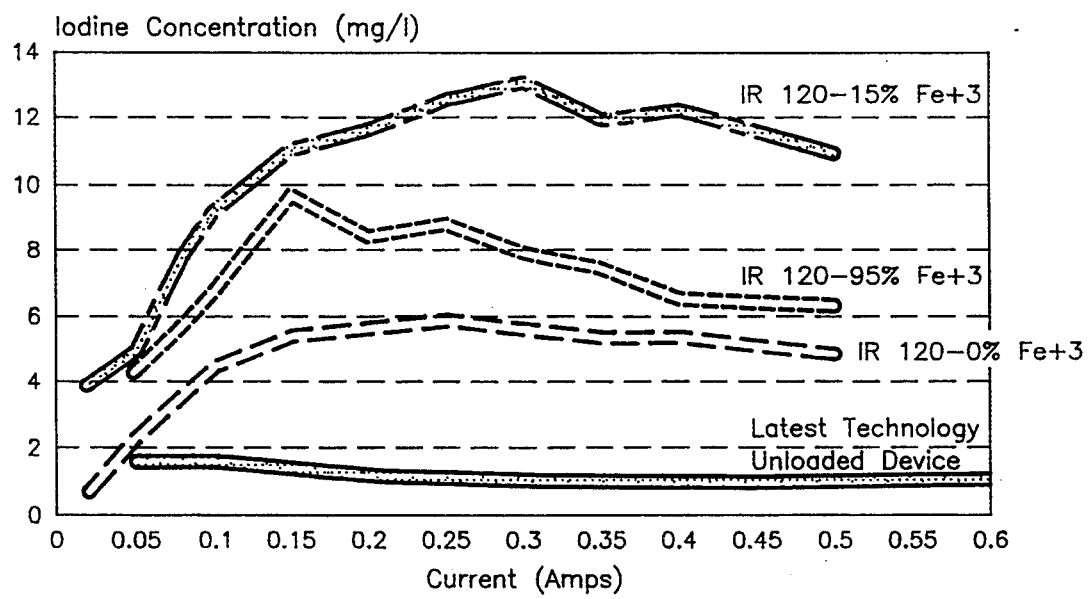
FIG. 3 is a graph showing the iodine concentration versus current produced by oxidation of an aqueous iodide solution by a process of the present invention using various loadings of the ion exchange material, and by a conventional process.
Figure 4:
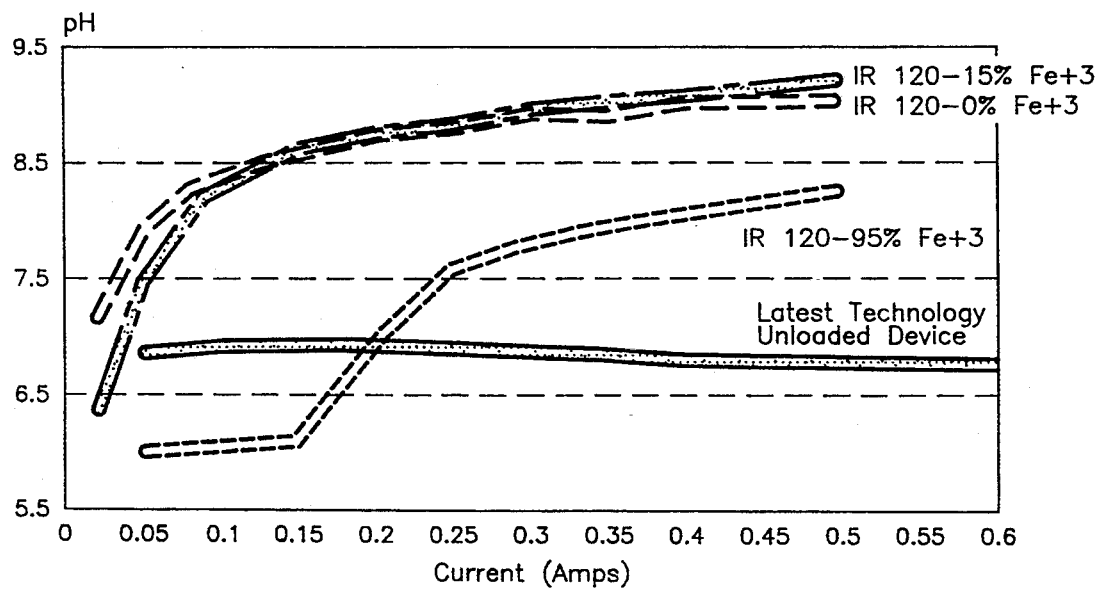
FIG. 4 is a graph showing the pH versus current of an oxidized aqueous iodide solution produced by a process of the present invention using various loadings of the ion exchange material, and by a conventional process.

The results of the electrolytic processes in procedures (A)–(D) are shown in FIGS. 3 and 4. FIG. 3 shows the total iodine concentration (mg/l) of the exiting solution, and FIG. 4 shows the pH of the same solution. In each example, the total iodine content of the solution exiting the packed bed electrolytic reactor was determined in accordance with the DPD Method 8031 of Hach Company using a Direct Reading Spectrophotometer Model No. DR/2000 for the measurement of iodine (0 to 7.00 mg/l), except that the instrument was blanked with deionized water between each sample. The pH of each solution was also measured by standard technique. "Total Iodine" is the combination of iodine and hypoiodous acid. This is sometimes referred to as "free iodine." The two components of free iodine are seldom referred to separately, because they are not easily distinguishable and because certain species are oxidized better by iodine and others by hypoiodous acid. Both components, however, are oxidizers. They exist in solution as a function of pH. At lower pH's, the equilibrium of the solution yields higher concentrations of iodine. As the pH rises, the equilibrium shifts, and higher concentrations of hypoiodous acid are present. The solution is about 50% iodine and 50% hypoiodous acid at a pH of about 7. For all of the examples described, the total halogen concentration and pH were measured in the exiting product stream.

It will be seen that the addition of the ion exchange material having infinite transfer sites (IR 120—0% $Fe+3$) greatly increases the production of iodine from that produced with the conventional reactor, without ion exchange resin packed therein. When resin with 15% of the transfer sites converted to semiconductor junctions (IR 120—15% $Fe+3$) was placed in the annular space, the production of iodine increased further, because not only were transfer sites available, but semiconductor junctions were also available to increase the anodic sites. When the resin with 95% of the transfer sites converted to semiconductor junctions (IR 120—95% $Fe+3$) was placed in the annular space, the production of iodine fell between no loading and 15% loading. It is believed that this lower conversion occurred because the number of transfer sites was greatly limited even though the number of semiconductor junctions was increased.

Example 6—Oxidation of Iodide Ions

Figure 5:
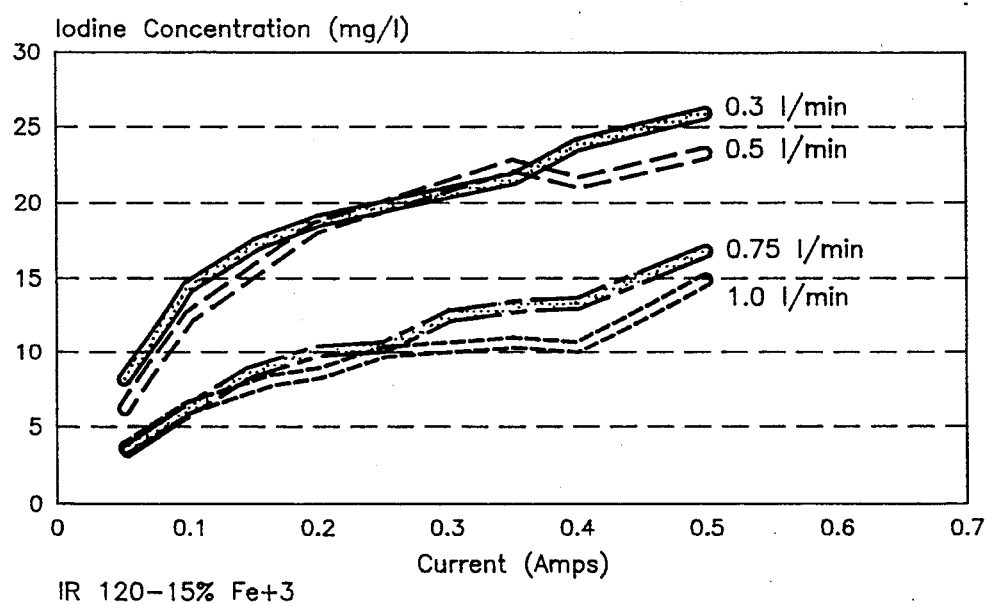
FIG. 5 is a graph showing iodine concentration versus current of an oxidized aqueous iodide solution produced by a process of the present invention at various flow rates.

The procedure of Example 5(B) was repeated, with the exception that the flow rates were varied. FIG. 5 shows the total iodine concentration at the various flow rates of 0.3 l/minute, 0.5 l/minute and 0.75 l/minute, as well as 1.0 l/minute. From this data, it can be seen that contact time through the reactor affects iodine production. The longer the contact time, the greater the conversion percentage.

Example 7—Oxidation of Iodide Ions

Figure 6:
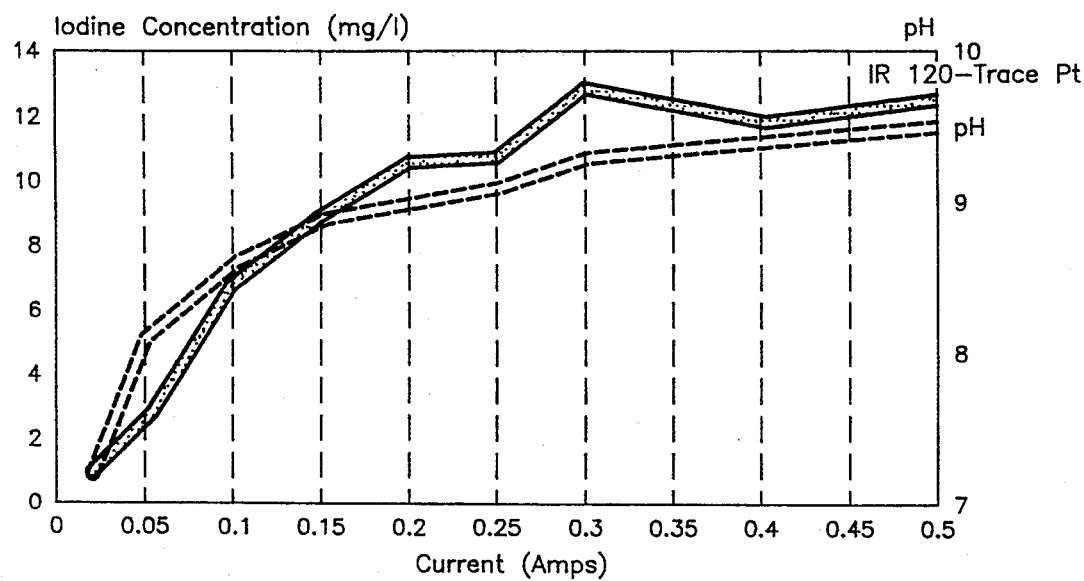
FIG. 6 is a graph showing iodine concentration and pH versus current for an oxidized aqueous iodide solution produced by a process of the present invention.

The procedure of Example 5(A) was repeated, with the exception that the annular space between the anode and cathode was packed with IR-120 Plus cation resin in which less than 1% of the ion exchange sites had been converted to $Pt^{+4}$ semiconductor junctions according to the procedure of Example 2. The total iodine concentration (mg/l) and the pH of the electrolytically oxidized solutions are shown in FIG. 6. The data in FIG. 6 shows that if the correct counter ion is chosen so as to facilitate the electrocatalytic reaction at the semiconductor junction, a smaller number of transfer sites need be converted to semiconductor junctions, because the semiconductor junctions are now specifically suited for the desired reactions.

Example 8—Oxidation of Bromide Ions

A sodium bromide (NaBr) feed solution was prepared as follows. First, a separate bed of cation resin was regenerated to the sodium form and another bed of anion resin was regenerated to the bromide form by passing a 10% solution of sodium bromide in softened water through them in a co-current manner as in a normal water softener device. The resin beds were then rinsed of excess NaBr solution. Tap water, pretreated by 5 micron pre-filtration followed by carbon treatment, to remove organic, chlorine and chloramine compounds that are normally found in public tap waters, was then passed in series through the resin beds to yield a feed solution of approximately 100 mg/l of NaBr.

Figure 7:
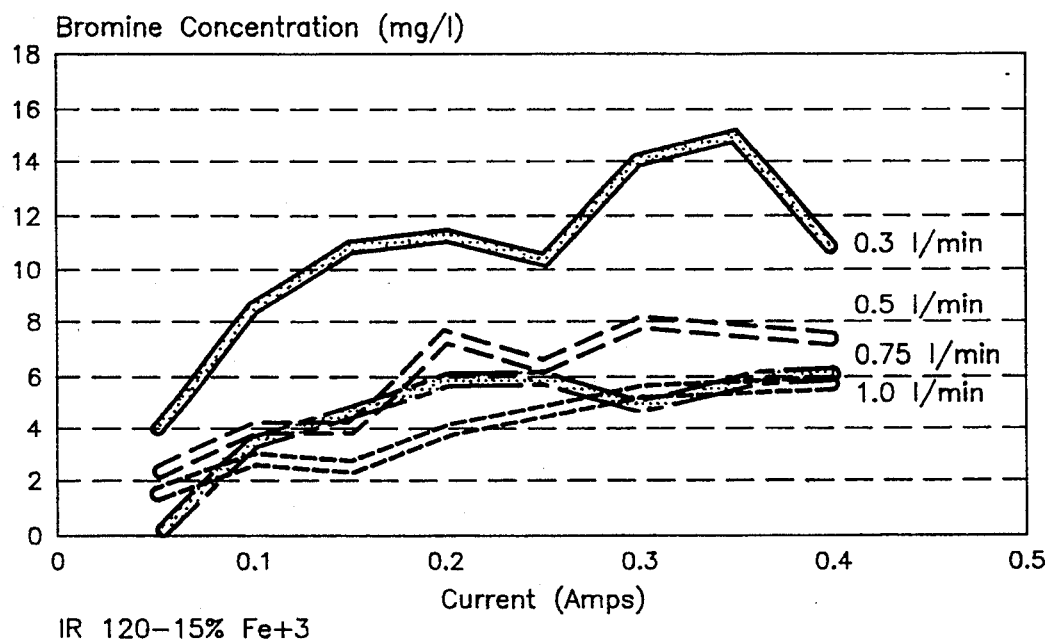
FIG. 7 is a graph showing bromine concentration versus current of an oxidized aqueous bromide solution produced by a process of the present invention at various flow rates in which the ion exchange material contains semiconductor junctions with ferric counter ions.

(A) The procedure of Example 5(B) was repeated, with the exception that the feed solution was the foregoing aqueous NaBr solution rather than a KI solution and the flow rates were varied. FIG. 7 shows the total bromine concentration at the various flow rates of 0.3 l/minute, 0.5 l/minute, 0.75 l/minute and 1.0 l/minute.

Figure 8:
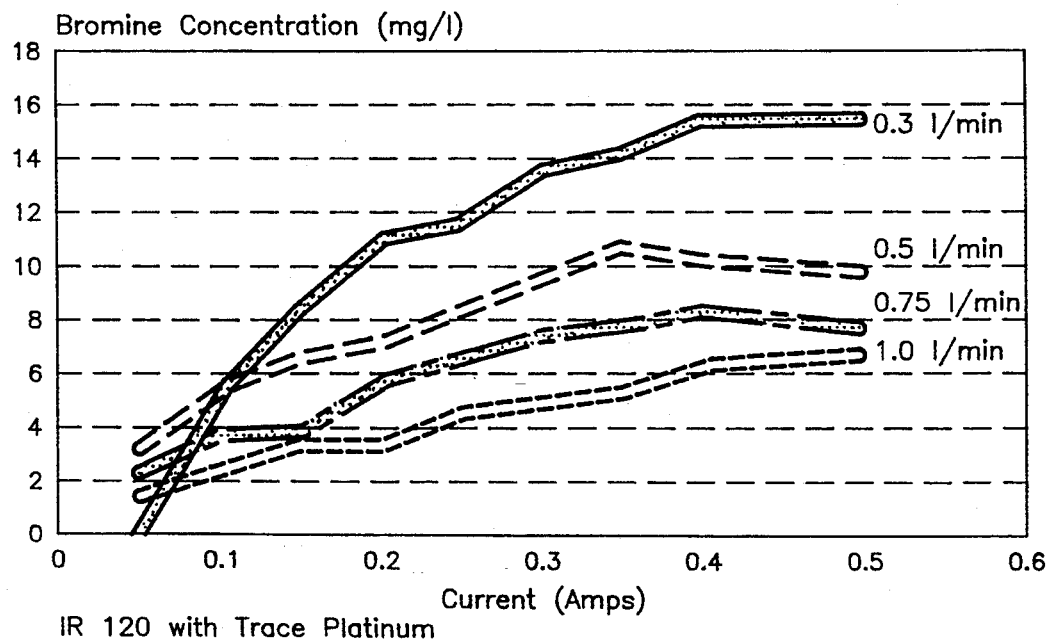
FIG. 8 is a graph showing bromine concentration versus current of an oxidized aqueous bromide solution produced by a process of the present invention at various flow rates in which the ion exchange material contains a small portion of semiconductor junctions with platinum counter ions.

(B) The procedure of Example 7 was repeated with the exception that a feed solution of NaBr rather than KI was used and that the total bromine concentration was measured at flow rates of 0.3 l/minute, 0.5 l/minute and 0.75 l/minute as well as at the flow rate of 1.0 l/minute. The results obtained are shown in FIG. 8.

Figure 9:
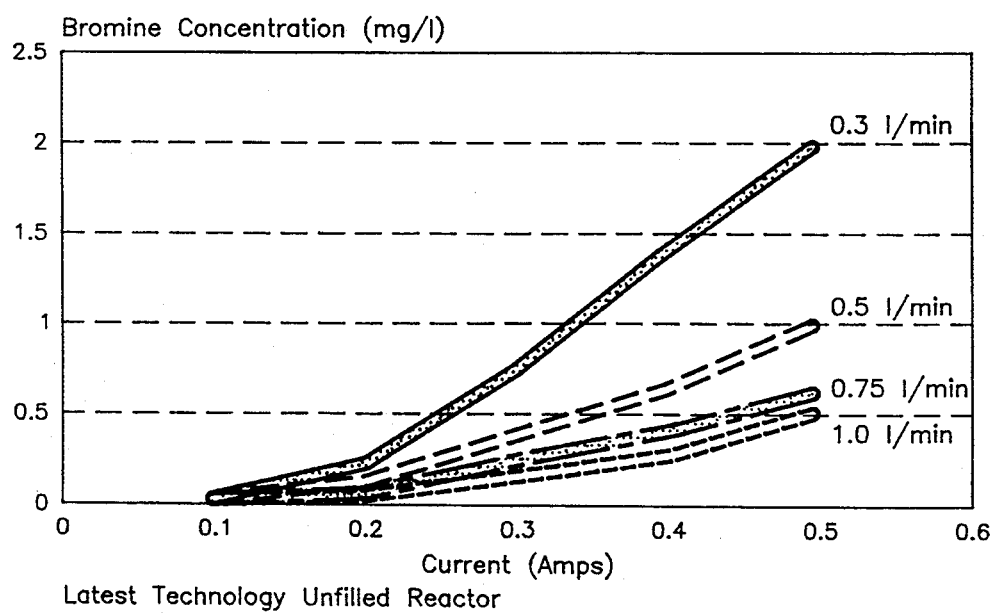
FIG. 9 is a graph showing bromine concentration versus current of an oxidized aqueous bromide solution produced by a conventional process at various flow rates.

(C) The procedure of Example 5(D) was repeated with the exception that the solution was a NaBr solution rather than a KI solution. Again, the NaBr solution flow rate was varied to obtain comparative results for the flow rates of 0.3 l/minute, 0.5 l/minute and 0.75 l/minute, as well as the flow rate of 1.0 l/minute. The results obtained using the conventional, unpacked electrolytic reactor are shown in FIG. 9.

In each of the above examples, the total bromine concentration was measured in accordance with the DPD Method 8031 of the Hach Company using a Direct Reading Spectrophotometer Model No. DR/2000, for the measurement of bromine (0 to 4.50 mg/l.), except that the instrument was blanked with deionized water between each sample. As with total iodine concentration, "total bromine" is the combination of bromine and hypobromous acid. This is sometimes referred to as "free bromine," and the discussion above regarding iodine and hypoiodous acid in aqueous solutions and their relative concentrations at varying pH's applies equally to bromine and hypobromous acid.

It will be seen from these bromide to bromine examples that the present invention works as well for this species as the iodide to iodine conversion shown in Examples 5, 6 and 7. Further, by comparing the results shown in FIG. 8 with the results shown in FIGS. 6 and 7, it will be seen that the known technology using the unfilled conventional reactor is significantly inferior to the present invention, irrespective of the flow rate utilized. In fact, the present invention exhibits significantly greater conversion at all flow rates and amperage levels.

It is preferred that the ion exchange material be packed tightly between (and around) the electrodes in the electrolytic reactor so as to ensure intimate contact between the ion exchange material particles themselves and the electrodes. This intimate contact ensures the highest efficiency of the conversion, either oxidation or reduction. However, it is contemplated as part of this invention that loose packing of the ion exchange material can be employed in appropriate circumstances. Although not necessarily achieving the highest overall efficiency for the system, there may be circumstances in which loose packing can be employed, since the benefits obtained by the present invention can still be achieved.

The foregoing descriptions and drawings should be considered as illustrative only of the principles of the invention. Since numerous applications of the present invention will readily occur to those skilled in the art, it is not desired to limit the invention to the specific examples disclosed or the exact construction and operation shown and described. Rather, all suitable modifications and equivalents may be resorted to, falling within the scope of the invention.

What is claimed is:

1. An electrolytic process for oxidizing a species in a dilute aqueous solution, comprising the steps of:
    passing an aqueous feed solution containing said species to be oxidized through a monobed of particulate modified cation exchange material interposed between an anode and a cathode, with said bed of modified cation exchange material in direct contact with both said anode and said cathode;
    applying a direct current across the anode and cathode;
    contacting said aqueous feed solution with said bed for a time to cause at least a portion of said species to be oxidized by said modified cation exchange material so that said aqueous solution contains said species in an oxidized form; and
    recovering the aqueous solution containing said oxidized species.

2. A process as defined in claim 1, wherein said modified cation exchange material has active semiconductor junctions formed by a cation species permanently bonded to said cation exchange material.

3. A process as defined in claim 2, wherein at least about 1% of the total ion exchange sites of said cation exchange material are active semiconductor junctions.

4. A process as defined in claim 2, wherein said semiconductor junctions are formed by polyvalent metal cations permanently bonded to said cation exchange material.

5. A process as defined in claim 1, wherein the step of passing said aqueous feed solution through said bed comprises passing said aqueous feed solution through at least two chambers, each of said chambers containing a particulate modified cation exchange material in contact with said anode and said cathode, and said chambers are separated from one another by a cation exchange membrane.

6. An electrolytic process as defined in claim 1, wherein said species to be oxidized is an organic species.

7. An electrolytic process as defined in claim 1, wherein said species to be oxidized is an inorganic species.

8. An electrolytic process for oxidizing an inorganic species as defined in claim 7, wherein said inorganic species to be oxidized is a halide.

9. A process as defined in claim 8, wherein the concentration of said halide in said aqueous feed solution is less than 1,500 mg/l.

10. A process as defined in claim 8, wherein said halide is iodide and the recovered aqueous solution contains hypoiodous acid.

11. A process as defined in claim 8, wherein said halide is bromide and the recovered aqueous solution contains hypobromous acid.

12. A process as defined in claim 8, wherein said halide is chloride and the recovered aqueous solution contains hypochlorous acid.

13. A process as defined in claim 1, wherein said oxidized species contained in said recovered aqueous solution is utilized in the oxidation treatment of large volume dilute aqueous solutions used in municipal drinking water supplies, water distributors, cooling towers and swimming pools.

14. A process as defined in claim 1, wherein said oxidized species contained in said recovered aqueous solution is utilized in the controlling of microbiological contamination in large volume dilute aqueous solutions used in municipal drinking water supplies, water distributors, cooling towers and swimming pools.

15. A method for on-site halogen treatment of dilute aqueous solutions used in large volumes in municipal drinking water supplies, water distributors, cooling towers and swimming pools, which comprises adding a halide salt to at least a portion of said aqueous solution, contacting said at least a portion of said aqueous solution containing said halide salt with a monobed of particulate modified cation exchange material interposed between an anode and a cathode of an electrolytic reactor, in which a direct current is applied across the anode and cathode, for a time to cause free radical formation in said modified cation exchange material and oxidation of at least a portion of said halide salt to halous acid by said modified cation exchange material, which halous acid then oxidizes undesirable contaminants in said dilute aqueous solution.

16. A method as defined in claim 15, wherein said electrolytic reactor is placed at an on-site location convenient for treatment of said dilute aqueous solution.

17. A method as defined in claim 15, wherein the undesirable contaminants oxidized in said dilute aqueous solution by said halous acid include inorganic and organic contaminants.

18. A method as defined in claim 15, wherein said halide is iodide and said halous acid is hypoiodous acid.

19. A method as defined in claim 15, wherein said halide is bromide and said halous acid is hypobromous acid.

20. A method as defined in claim 15, wherein said halide is chloride and said halous acid is hypochlorous acid.

21. A method as defined in claim 15, wherein said modified cation exchange material has active semiconductor junctions formed by a cation species permanently bonded to said cation exchange material.

22. A method as defined in claim 21, wherein said semiconductor junctions are formed by polyvalent metal cations permanently bonded to said cation exchange material.

23. A method as defined in claim 15, wherein said dilute aqueous solution to be treated is a municipal drinking water supply.

24. A method as defined in claim 15, wherein said dilute aqueous solution to be treated is a water distributor.

25. A method as defined in claim 15, wherein said dilute aqueous solution to be treated is water for a cooling tower.

26. A method as defined in claim 15, wherein said dilute aqueous solution to be treated is swimming pool water.

27. A method for on-site halogen control of microbiological contamination in dilute aqueous water solutions used in large volumes in municipal drinking water supplies, water distributors, cooling towers and swimming pools, which comprises adding a halide salt to at least a portion of said aqueous solution, contacting said at least a portion of said aqueous solution containing said halide salt with a monobed of particulate modified cation exchange material interposed between an anode and a cathode of an electrolytic reactor, in which a direct current is applied across the anode and cathode, for a time to cause free radical formation in said modified cation exchange material add oxidation of at least a portion of said halide salt to halous acid by said modified cation exchange material, which halous acid then oxidizes undesirable contaminants in said dilute aqueous solution.

28. A method as defined in claim 27, wherein said electrolytic reactor is placed at an on-site location convenient for treatment of said dilute aqueous solution.

29. A method as defined in claim 27, wherein said halide is iodide and said halous acid is hypoiodous acid.

30. A method as defined in claim 27, wherein said halide is bromide and said halous acid is hypobromous acid.

31. A method as defined in claim 27, wherein said halide is chloride and said halous acid is hypochlorous acid.

32. A method as defined in claim 27, wherein said modified cation exchange material has active semiconductor junctions formed by a cation species permanently bonded to said cation exchange material.

33. A method as defined in claim 32, wherein said semiconductor junctions are formed by polyvalent metal cations permanently bonded to said cation exchange material.

34. A system for on-site halogen treatment of dilute aqueous solutions used in large volumes in municipal drinking water supplies, water distributors, cooling towers and swimming pools, which comprises:

means for transferring at least a portion of said aqueous solution from its normal flow to a monobed of particulate modified cation exchange material interposed between and in direct contact with an anode and a cathode of a nearby electrolytic reactor;

electric means for applying a direct current across the anode and cathode;

means for contacting said transferred aqueous solution with said bed to cause at least a portion of halide salt in said aqueous solution to be oxidized to halous acid by said modified cation exchange material; and means for returning said transferred aqueous solution to its normal flow to oxidize undesirable contaminants or control microbiological contamination in said dilute aqueous solution being treated.

35. A system as defined in claim 34, wherein said halide is iodide and said halous acid is hypoiodous acid.

36. A system as defined in claim 34, wherein said halide is bromide and said halous acid is hypobromous acid.

37. A system as defined in claim 34, wherein said halide is chloride and said halous acid is hypochlorous acid.

38. A system as defined in claim 34, wherein said modified cation exchange material has active semiconductor junctions formed by a cation species permanently bonded to said cation exchange material.

39. A system as defined in claim 38, wherein at least about 1% of the total ion exchange sites of said cation exchange material are active semiconductor junctions.

40. A system as defined in claim 38, wherein said semiconductor junctions are formed by polyvalent metal cations permanently bonded to said cation exchange material.

* * * * *